United States Patent
Yoshida (10) Patent No.: US 10,260,434 B2
(45) Date of Patent: Apr. 16, 2019

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Akimitsu Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/862,978

(22) Filed: Jan. 5, 2018

(65) Prior Publication Data

US 2018/0230917 A1    Aug. 16, 2018

(30) Foreign Application Priority Data

Feb. 16, 2017  (JP) .................. 2017-027083

(51) Int. Cl.
*F01P 9/00* (2006.01)
*F02D 41/00* (2006.01)
(Continued)

(52) U.S. Cl.
CPC ............ *F02D 41/0007* (2013.01); *F01P 3/14* (2013.01); *F01P 7/12* (2013.01); *F01P 7/161* (2013.01); *F02B 29/0437* (2013.01); *F02B 29/0443* (2013.01); *F02B 37/12* (2013.01); *F02B 39/16* (2013.01); *F02D 41/0065* (2013.01); *F02D 41/062* (2013.01); *F02D 41/22* (2013.01);
(Continued)

(58) Field of Classification Search
CPC ................... F01P 7/00; F01P 7/02; F01P 7/14

USPC ................ 123/41.01, 41.02, 41.05
See application file for complete search history.

(56) References Cited

U.S. PATENT DOCUMENTS

2008/0087238 A1* 4/2008 Held ............... F01P 7/165
  123/41.48
2016/0068037 A1* 3/2016 Burke ............... B60H 1/00271
  62/243

(Continued)

FOREIGN PATENT DOCUMENTS

FR    2 988 136 A1   9/2013
FR    3 001 797 A1   8/2014
(Continued)

*Primary Examiner* — John Kwon
(74) *Attorney, Agent, or Firm* — Oliff PLC (57) ABSTRACT

A controller includes a forced-induction-device controlling section, an obtaining section that is configured to repeatedly obtain a temperature of the coolant in the intake-air cooling system, a determining section that is configured to determine whether the temperature obtained by the obtaining section is higher than or equal to a forced-induction limiting control starting temperature. On condition that the temperature of the coolant has risen to a value at which the determining section determines that the temperature obtained by the obtaining section is higher than or equal to the forced-induction limiting control starting temperature, the forced-induction-device controlling section starts a forced-induction limiting control to lower a forced-induction pressure. In the forced-induction limiting control, the forced-induction-device controlling section increases an extent of limiting of the forced induction as the temperature obtained by the obtaining section becomes closer to the boiling point.

9 Claims, 4 Drawing Sheets

(51) Int. Cl.
    *F01P 7/12*     (2006.01)
    *F01P 7/16*     (2006.01)
    *F01P 3/14*     (2006.01)
    *F02D 41/06*     (2006.01)
    *F02B 29/04*     (2006.01)
    *F02B 39/16*     (2006.01)
    *F02D 41/22*     (2006.01)
    *F02B 37/12*     (2006.01)
    *F01P 7/02*     (2006.01)

(52) U.S. Cl.
    CPC ..... *F01P 2060/02* (2013.01); *F02B 2039/164* (2013.01); *F02B 2039/166* (2013.01); *F02D 2041/0067* (2013.01); *F02D 2041/227* (2013.01); *F02D 2200/0406* (2013.01); *Y02T 10/144* (2013.01); *Y02T 10/146* (2013.01); *Y02T 10/40* (2013.01)

(56) References Cited

U.S. PATENT DOCUMENTS

2017/0241324 A1*   8/2017   Liu .................... F01P 5/10
2018/0229581 A1*   8/2018   Burke ............... B60H 1/00271

FOREIGN PATENT DOCUMENTS

| JP | S59-032614 A | 2/1984 |
| JP | 2009-103055 A | 5/2009 |
| JP | 2016-079935 A | 5/2016 |

\* cited by examiner

140
CONTROLLER AND CONTROL METHOD FOR INTERNAL COMBUSTION ENGINE

BACKGROUND OF THE INVENTION

The present invention relates to a controller and a control method for an internal combustion engine that control an internal combustion engine equipped with a forced-induction device.

An intercooler is arranged in an internal combustion engine equipped with a forced-induction device. The intercooler cools intake air after the intake air is compressed by the forced-induction device so that the temperature of the intake air is increased. The intake-air cooling system, in which the intercooler is arranged, includes a radiator that releases heat from coolant and a pump that circulates the coolant.

If a foreign object such as a piece of cardboard or a plastic bag adheres to the radiator, sufficient heat release is hampered. This raises the temperature of the coolant that flows in the intake-air cooling system. If maintained in this state, the coolant may boil.

To prevent such overheating, Japanese Laid-Open Patent Publication No. 2016-79935 discloses reduction of the output of an internal combustion engine to prevent overheating of a forced-induction device. Also, Japanese Laid-Open Patent Publication No. 2009-103055 discloses lowering of forced-induction pressure to prevent overheating of an internal combustion engine.

If heat release by the radiator becomes insufficient and the temperature of the coolant becomes excessively high, forced induction may be limited to lower the forced-induction pressure.

However, since such limitation of the forced induction decreases the output of the internal combustion engine, the limitation of the forced induction for preventing overheating may significantly decrease the output of the engine.

SUMMARY OF THE INVENTION

In accordance one aspect of the present invention, a controller for an internal combustion engine is provided. The controller is configured to be employed in an internal combustion engine including a forced-induction device, an intercooler that cools an air compressed by the forced-induction device, a radiator that releases heat from coolant that has passed through the intercooler, and a pump that is arranged in an intake-air cooling system in which the intercooler and the radiator are arranged. The controller includes a forced-induction-device controlling section that is configured to control the forced-induction device, an obtaining section that is configured to repeatedly obtain a temperature of the coolant in the intake-air cooling system, and a determining section that is configured to determine whether the temperature obtained by the obtaining section is higher than or equal to a forced-induction limiting control starting temperature, which is lower than a boiling point of the coolant. The forced-induction-device controlling section is configured to, on condition that the temperature of the coolant in the intake-air cooling system has risen to a value at which the determining section determines that the temperature obtained by the obtaining section is higher than or equal to the forced-induction limiting control starting temperature, start a forced-induction limiting control which a forced-induction pressure is lowered to a value lower than that before the determination that the obtained temperature is higher than or equal to the forced-induction limiting control starting temperature. The forced-induction-device controlling section is configured to, in the forced-induction limiting control, increase an extent of limiting of the forced induction as the temperature obtained by the obtaining section becomes closer to the boiling point of the coolant in the intake-air cooling system.

In the above-described configuration, when the temperature of the coolant rises to a value higher than or equal to the forced-induction limiting control starting temperature, the controller gradually increases the extent of limiting of the forced induction through the forced-induction limiting control, while monitoring the temperature of the coolant. This prevents excessive limitation of the forced induction compared to a case in which the forced induction is limited to a constant extent when the temperature of the coolant flowing in the intake-air cooling system is close to the boiling point. Also, in the forced-induction limiting control, the extent of limiting of the forced induction is updated based on the temperature of the coolant, which is obtained repeatedly, to become higher as the temperature of the coolant becomes closer to the boiling point. Therefore, when the extent of limitation of the forced induction is insufficient and the temperature of the coolant becomes closer to the boiling point, the extent of such limitation is increased by a greater amount. That is, if the extent of limiting of the forced induction is insufficient despite the gradual change of the extent of such limitation, the extent of limiting of the forced induction is increased quickly, Insufficient limitation of the forced induction is thus also prevented.

As a result, the configuration limits significant decrease of the output of the internal combustion engine, while limiting the forced induction to prevent overheating.

In the above-described the forced-induction limiting control, the forced-induction-device controlling section is configured to repeatedly update the extent of limiting of the forced induction while changing a change amount of the extent of limiting, of the forced induction for a single update operation based on the temperature obtained by the obtaining section and to increase the extent of limiting of the forced induction by updating the extent of limiting of the forced induction such that the extent of limiting of the forced induction is updated by a change amount that becomes greater as the temperature obtained by the obtaining section becomes closer to the boiling point of the coolant in the intake-air cooling system.

In the above-described configuration, as the temperature of the coolant becomes closer to the boiling point, the change amount used to update the extent of limitation is set to be greater such that the change amount of the extent of limiting of the forced induction for a single time of updating becomes greater. As a result, when the extent of limitation is insufficient and the temperature of the coolant becomes closer to the boiling point, the extent of limiting of the forced induction is increased by a greater amount.

In accordance with one form of the controller, the forced-induction-device controlling section is configured to increase the extent of limiting of the forced induction in the forced-induction limiting control by setting an upper control limit of the forced-induction pressure to become lower as the temperature obtained by the obtaining section becomes closer to the boiling point of the coolant in the intake-air cooling system.

In the above-described configuration, by lowering the upper limit of the forced-induction pressure, the forced-induction pressure is limited in the range lower than the upper limit. The forced induction is thus limited. Also, since the forced induction is limited by controlling the upper limit of the forced-induction pressure, the forced-induction pressure is controlled to be equal to the target forced-induction pressure when the target forced-induction pressure is lower than the upper limit. That is, unnecessarily great limitation of the forced induction is prevented.

In accordance with one form of the controller, the determining section is configured to determine whether the temperature obtained by the obtaining section is lower than or equal to a returning temperature that is lower than the forced-induction limiting control starting temperature. The forced-induction-device controlling section is configured to end the forced-induction limiting control on condition that the determining section determines that the temperature obtained by the obtaining section is lower than or equal to the returning temperature.

In the above-described configuration, when a foreign object that adheres to the radiator is removed to recover the heat-release performance of the radiator and the temperature of the coolant is lowered to the returning temperature, the forced-induction limiting control is ended. This cancels the limitation of the forced induction and the normal control is restored.

Further, in accordance with one form of the controller, the forced-induction-device controlling section is configured not to change the extent of limiting of the forced induction in the forced-induction limiting control if the temperature obtained by the obtaining section is lower than the forced-induction limiting control starting temperature and is in a range of a predetermined temperature difference with respect to the returning temperature.

In the above-described configuration, by increasing the extent of limiting of the forced induction through the forced-induction limiting control, the temperature of the coolant is lowered. After the temperature of the coolant reaches a value in the range of the predetermined temperature difference with respect to the returning temperature, the extent of limiting of the forced induction is maintained. This ends the change of the extent of limiting of the forced induction and stabilizes the operating state of the internal combustion engine while maintaining the temperature of the coolant in such a range that boiling does not happen.

In accordance with one form of the controller, the forced-induction-device controlling section is configured to, when ending the forced-induction limiting control, gradually lower the extent of limiting of the forced induction by the forced-induction limiting control.

If the forced-induction limiting control is ended and the extent of limiting of the forced induction is quickly lowered to cancel the limitation of the forced induction, the forced-induction pressure may rapidly rise. However, in the above-described configuration, rapid rise of the forced-induction pressure is limited at the time the forced-induction limiting control is ended.

In accordance with one form of the controller, the controller also includes a cooling-system controlling section that controls a shutter and the pump. The shutter is arranged forward of the radiator and a fan that delivers air to the radiator and selectively opens and closes part of an air delivery path to the radiator. The determining section is configured to determine whether the temperature obtained by the obtaining section is higher than or equal to a heat-release-performance enhancing control starting temperature, which is lower than the forced-induction limiting control starting temperature. The cooling-system controlling section is configured to control the fan, the shutter, and the pump to start a heat-release-performance enhancing control by which a heat-release performance of the intake-air cooling system is enhanced, on condition that the temperature of the coolant in the intake-air cooling system has risen to a value at which the determining section determines that the temperature obtained by the obtaining section is higher than or equal to the heat-release-performance enhancing control starting temperature.

In the above-described configuration, prior to the forced-induction limiting control, the heat-release-performance enhancing control, by which the heat-release performance of the intake-air cooling system is enhanced, is performed to prevent overheating. Then, if the temperature of the coolant rises despite the heat-release-performance enhancing control and reaches the forced-induction limiting control starting temperature, the forced-induction limiting control is started.

That is, the heat-release-performance enhancing control, which prevents overheating without decreasing the output of the internal combustion engine, is first performed. Then, if prevention of overheating is unachievable, the forced-induction limiting control is performed. That is, a means for preventing overheating is employed while refraining from the forced-induction limiting control, which would decrease the output of the engine. This prevents the engine output from being limited due to attempt to prevent overheating.

In accordance with a second aspect of the present invention, a control method for an internal combustion engine is provided. The engine includes a forced-induction device, an intercooler that cools an air compressed by the forced-induction device, a radiator that releases heat from coolant that has passed through the intercooler, and a pump that is arranged in an intake-air cooling system in which the intercooler and the radiator are arranged. The control method includes: controlling the forced-induction device; repeatedly obtaining a temperature of the coolant in the intake-air cooling system; determining whether the obtained temperature is higher than or equal to a forced-induction limiting control starting temperature, which is lower than a boiling point of the coolant; on condition that the temperature of the coolant in the intake-air cooling system has risen to a value at which the determination is made that the obtained temperature is higher than or equal to the forced-induction limiting control starting temperature, starting a forced-induction limiting control by which a forced-induction pressure is lowered to a value lower than that before the determination that the obtained temperature is higher than or equal to the forced-inducts on limiting control starting temperature; and increasing an extent of limiting of the forced induction as the obtained temperature becomes closer to the boiling point of the coolant in the intake-air cooling system in the forced-induction limiting control.

In accordance with a third aspect of the present invention, a controller for an internal combustion engine is provided. The controller is configured to be employed in an internal combustion engine including a forced-induction device, an intercooler that cools an air compressed by the forced-induction device, a radiator that releases heat from coolant that has passed through the intercooler, and a pump that is arranged in an intake-air cooling system in which the intercooler and the radiator are arranged. The controller includes circuitry, which is configured to; control the forced-induction device; repeatedly obtain a temperature of the coolant in the intake-air cooling system; determine whether the obtained temperature is higher than or equal to a forced-induction limiting control starting temperature, which is lower than a boiling point of the coolant; on condition that the temperature of the coolant in the intake-air cooling system has risen to a value at which the determination is made that the obtained temperature is higher than or equal to the forced-induction limiting control starting temperature, start a forced-induction limiting control by which a forced-induction pressure is lowered to a value lower than that before the determination that the obtained temperature is higher than or equal to the forced-induction limiting control starting temperature; and increase an extent of limiting of the forced induction to become as the obtained temperature becomes closer to the boiling point of the coolant in the intake-air cooling system in the forced-induction limiting control.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A controller 100 for an internal combustion engine according to one embodiment will now be described with reference to FIGS. 1 to 5.

Figure 1:
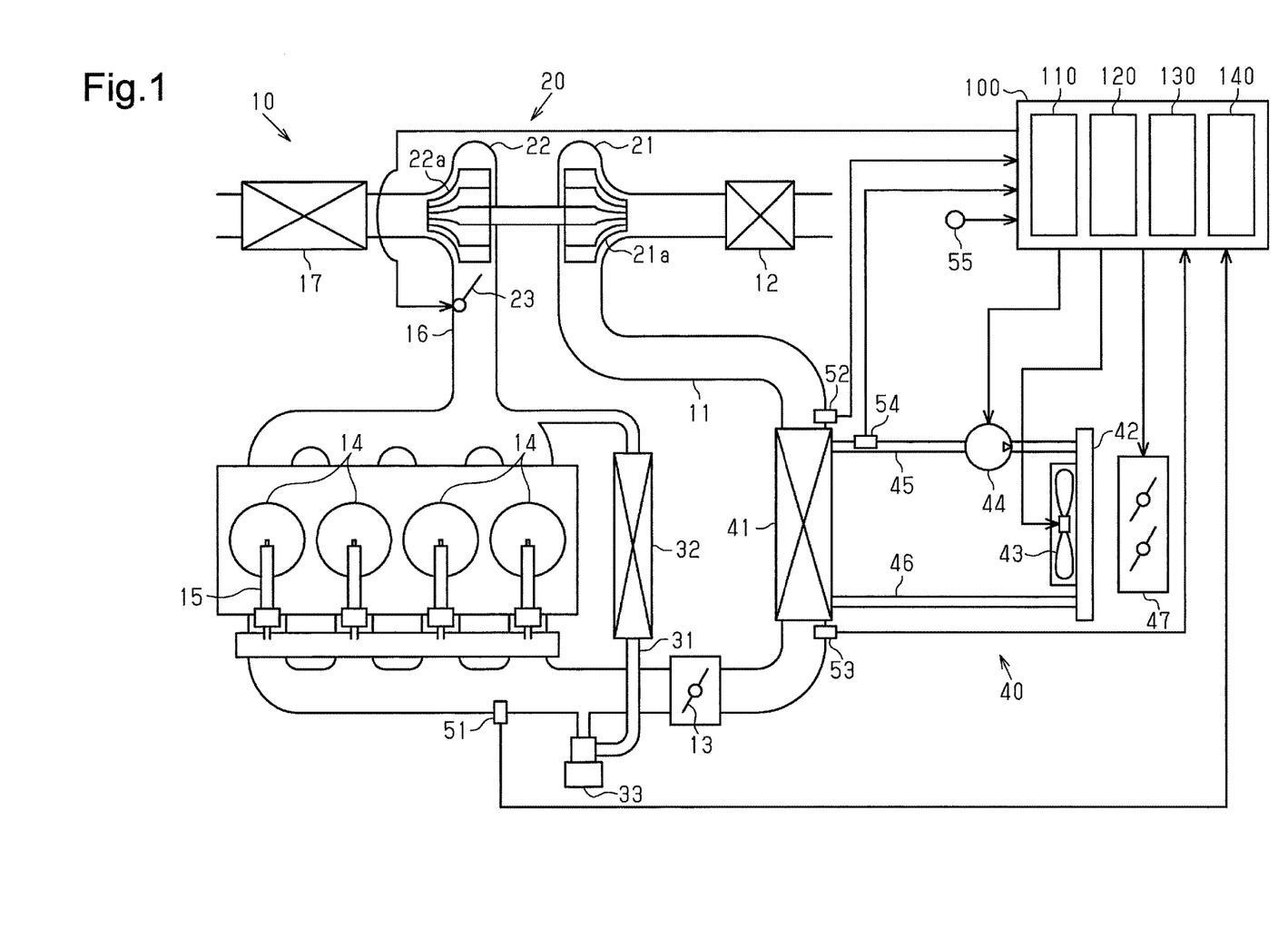
FIG. 1 is a schematic diagram representing a controller for an internal combustion engine according to one embodiment and a diesel engine as a control target of the controller.

FIG. 1 shows the controller 100 according to the present embodiment, which configured to control a diesel engine 10 mounted in a vehicle.

With reference to FIG. 1, a turbocharger 20 is mounted in the diesel engine 10 as a forced-induction device. An air cleaner 12, a compressor 21, an intercooler 41, and an intake-air throttle valve 13 are arranged sequentially from upstream in an intake passage 11 of the diesel engine 10. The air cleaner 12 filters the air drawn into the intake passage 11. The compressor 21 compresses the air and discharges the air downstream by rotating a compressor wheel 21a, which is incorporated in the compressor 21. The intercooler 41 cools the air that has been compressed by the compressor 21. The intake-air throttle valve 13 changes its opening degree to adjust the flow amount of the air that flows in the intake passage 11, which is an intake air amount.

A section of the intake passage 11 downstream of the intake-air throttle valve 13 is branched in accordance with the number of the cylinders of the diesel engine 10. The respective branches of the intake passage 11 are connected to corresponding combustion chambers 14, each of which is configured by the corresponding one of the cylinders. A fuel injection valve 15 is arranged in each of the combustion chambers 14. Each combustion chamber 14 burns air-fuel mixture, which contains the air drawn through the intake passage 11 and the fuel injected by the corresponding fuel injection valve 15.

Exhaust gas, which is produced by burning the air-fuel mixture in the combustion chambers 14, is discharged through an exhaust passage 16 of the diesel engine 10. A turbine 22 and an exhaust-gas purifying device 17 are arranged sequentially from upstream in the exhaust passage 16. The turbine 22 incorporates a turbine wheel 22a, which is connected to the compressor wheel 21a in an integrally rotatable manner through a shaft. The turbine 22, together with the compressor 21, configures the turbocharger 20. The exhaust-gas purifying device 17 collects particulate matter from the exhaust gas, thus purifying the exhaust gas.

In the turbocharger 20, flow of the exhaust gas rotates the turbine wheel 22a, thus rotating the compressor wheel 21a together with the turbine wheel 22a. In this manner, forced induction, through which the compressed air is delivered into the combustion chambers 14, is carried out. That is, by driving the turbine wheel 22a using the flow of exhaust gas, the turbocharger 20 performs the forced induction of the intake air of the diesel engine 10. A variable nozzle 23 is arranged in an exhaust-gas blowing port for the turbine wheel 22a in the turbine 22 to change the cross-sectional area of the exhaust-gas blowing port in accordance with change of the opening degree. As a result, by adjusting the opening degree of the variable nozzle 23, the flow of the exhaust gas that is blown onto the turbine wheel 22a, as well as the pressure of the intake air after the forced induction, which is forced-induction pressure, is adjusted.

The diesel engine 10 also includes an exhaust-gas recirculation (EGR) passage (hereinafter, referred to as an EGR passage 31), which allows communication between a section of the exhaust passage 16 upstream of the turbine 22 and the section of the intake passage 11 downstream of the intake-air throttle valve 13. The EGR passage 31 includes an EGR cooler 32, which cools the exhaust gas that passes through the EGR passage 31 and is recirculated into the intake air, and an EGR valve 33, which adjusts the recirculation amount of the exhaust gas into the intake air by changing the opening degree.

A radiator 42 is connected to the intercooler 41, which is arranged in the intake passage 11, through a first coolant passage 45 and a second coolant passage 46. The first coolant passage 45 connects a coolant outlet of the intercooler 41 to a coolant inlet of the radiator 42. The second coolant passage 46 connects a coolant outlet of the radiator 42 to a coolant inlet of the intercooler 41. A pump 44, which delivers coolant from the intercooler 41 to the radiator 42, is arranged in the first coolant passage 45.

The radiator 42 is arranged in the engine compartment of the vehicle, in which the diesel engine 10 is mounted, facing a grille located forward in the vehicle. A motor-driven fan 43 is arranged rearward of the radiator 42 in the vehicle. The motor-driven fan 43 draws air from forward of the radiator 42 in the vehicle toward the radiator 42. By drawing the air into the radiator 42 in this manner, the fan 43 delivers air to the radiator 42. A grille shutter 47, which is a shutter that selectively opens and closes a section of an air delivery path to the radiator 42, is arranged forward of the radiator 42. The grille shutter 47 is arranged on the lower side of the grille in the vehicle. When the vehicle travels and the grille shutter 47 is closed, relative wind caused by the vehicle are blocked by the grille shutter 47 and guided to under the floor of the vehicle. This improves the airflow regulating effect under the floor.

In the diesel engine 10, the intercooler 41, the radiator 42, the fan 43, the pump 44, the first coolant passage 45, the second coolant passage 46, and the grille shutter 47 configure an intake-air cooling system 40.

The diesel engine 10 is controlled by a controller 100. The controller 100 includes a central processing unit that performs various types of calculation procedures, a read-only memory that memorizes programs and data for the calculation procedures in advance, and a random-access memory that temporarily memorizes calculation results of the central processing unit and detection results of various types of sensors. Detection signals of the sensors, which are arranged in corresponding sections of the diesel engine 10, are input to the controller 100. The sensors include an intake-air pressure sensor 51, an upstream-side intake-air temperature sensor 52, a downstream-side intake-air temperature sensor 53, a coolant temperature sensor 54, and a vehicle speed sensor 55. The intake-air pressure sensor 51 detects the forced-induction pressure Pim, which is the pressure of the intake air in a section of the intake passage 11 downstream of the intake-air throttle valve 13. The upstream-side intake-air temperature sensor 52 detects the inlet intake-air temperature Thai, which is the temperature of the intake air in a section of the intake passage 11 that is downstream of the compressor 21 and upstream of the intercooler 41. The downstream-side intake-air temperature sensor 53 detects the outlet intake-air temperature Thao, which is the temperature of the intake air in a section of the intake passage 11 that is downstream of the intercooler 41 and upstream of the intake-air throttle valve 13. The coolant temperature sensor 54 detects the outlet coolant temperature Thwo, which is the temperature of the coolant in a section of the first coolant passage 45 closer to the intercooler 41 than the pump 44. The vehicle speed sensor 55 detects the vehicle speed SPD, which is the speed of the vehicle in which the diesel engine 10 is mounted.

The controller 100 is configured to control the fuel injection valves 15 and the intake-air throttle valve 13. The controller 100 includes a forced-induction-device controlling section 110, which is configured to control the turbocharger 20, and a cooling-system controlling section 120, which is configured to control the intake-air cooling system 40. The controller 100 also includes an obtaining section 130, which is configured to obtain the forced-induction pressure Pim, the inlet intake-air temperature Thai, the outlet intake-air temperature Thao, the outlet coolant temperature Thwo, and the vehicle speed SPD, which are detected by the aforementioned various types of sensors, repeatedly at predetermined cycles during operation of the diesel engine 10.

The forced-induction-device controlling section 110 is configured to control the variable nozzle 23 to change its opening degree. Basically, the forced-induction-device controlling section 110 changes the opening degree of the variable nozzle 23 such that the forced-induction pressure Pim, which is obtained by the obtaining section 130, becomes close to the target forced-induction pressure Pimtrg, which is the target of the forced-induction pressure. Specifically, the target forced-induction pressure Pimtrg is changed in accordance with the operating state of the diesel engine 10.

The cooling-system controlling section 120 is configured to control the pump 44, the fan 43, and the grille shutter 47 in the intake-air cooling system 40. In controlling the pump 44, the cooling-system controlling section 120 basically adjusts the drive duty cycle of the pump 44 such that the outlet intake-air temperature Thao, which is obtained by the obtaining section 130, becomes close to the target intake-air temperature Thatrg, which is the target of the intake-air temperature. Meanwhile, the cooling-system controlling section 120 adjusts the duty cycle of the pump 44 such that the outlet coolant temperature Thwo, which is obtained by the obtaining section 130, becomes close to the target coolant temperature. Thatrg, which is the target of the coolant temperature. Specifically, the cooling-system controlling section 120 calculates a reference duty cycle in accordance with the inlet intake-air temperature Thai. Then, with reference to the calculated duty cycle, the cooling-system controlling section 120 performs feedback control on the duty cycle depending on the result of comparison between the target intake-air temperature Thatrg and the outlet intake-air temperature Thao. That is, the cooling-system controlling section 120 sets the duty cycle to become greater as the outlet intake-air temperature Thao becomes higher in relation to the target intake-air temperature Thatrg and sets the duty cycle to become smaller as the outlet intake-air temperature Thao becomes lower in relation to the target intake-air temperature Thatrg. Also, the cooling-system controlling section 120 compares the outlet coolant temperature Thwo, which is obtained by the obtaining section 130, with the target coolant temperature Thwtig. Then, by performing the feedback control, the cooling-system controlling section 120 sets the duty cycle to become greater as the outlet coolant temperature Thwo becomes higher in relation to the target coolant temperature Thwtrg and sets the duty cycle to become smaller as the outlet coolant temperature Thwo becomes lower in relation to the target coolant temperature Thwtrg.

In controlling the fan 43, the cooling-system controlling section 120 adjusts the duty cycle of the fan 43 in accordance with the vehicle speed SPD, which is obtained by the obtaining section 130. Specifically, when the vehicle speed SPD is high, the duty cycle is set to a small value. In controlling the grille shutter 47, the cooling-system controlling section 120 selectively opens and closes the grille shutter 47 in accordance with the vehicle speed SPD, which is obtained by the obtaining section 130. Specifically, the cooling-system controlling section 120 opens the grille shutter 47 if the vehicle speed SPD is lower than a predetermined vehicle speed and closes the grille shutter 47 if the vehicle speed SPD is higher than or equal to the predetermined vehicle speed. In this manner, when the vehicle travels at a high speed and produces excessive relative wind for the intake-air cooling system 40, the cooling-system controlling section 120 closes the grille shutter 47 and guides the relative wind to under the floor. This improves the airflow regulating effect under the floor and decreases the air resistance that is caused by introducing the relative wind into the engine compartment.

The controller 100 is configured to perform not only the above-described control but also control for preventing boiling of the coolant in the intake-air cooling system 40. The controller 100 includes a determining section 140 to perform the control for preventing boiling of the coolant in addition to the forced-induction-device controlling section 110 and the cooling-system controlling section 120. The determining section 140 is configured to, based on the outlet coolant temperature Thwo obtained by the obtaining section 130, determine whether the outlet coolant temperature Thwo has reached a temperature for switching controlling manners for preventing boiling of the coolant.

The control for preventing boiling of the coolant, which is performed by the controller 100, will hereafter be described in detail.

Figure 2:
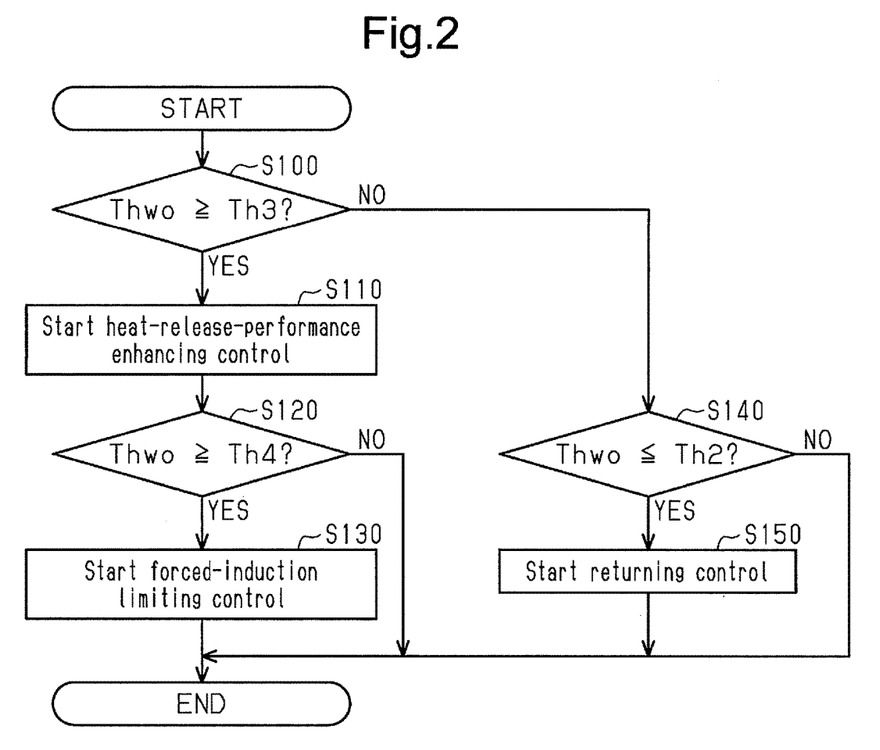
FIG. 2 is a flowchart representing a series of procedure performed by the controller of the embodiment to prevent boiling of coolant.

FIG. 2 represents a series of procedure that is performed by the controller 100 to switch the controlling manners. The series of procedure is performed by the controller 100 repeatedly at predetermined control cycles during operation of the diesel engine 10.

With reference to FIG. 2, when the series of procedure is started, the determining section 140 of the controller 100 determines, in step S100, whether the outlet coolant temperature Thwo, which is obtained by the obtaining section 130, is higher than or equal to a heat-release-performance enhancing control starting temperature Th3. The heat-release-performance enhancing control starting temperature Th3 is the temperature of the coolant that is the threshold value with reference to which heat-release-performance enhancing control, which will be described later, is started and is set to a temperature lower than the boiling point Th5 of the coolant. Also, the heat-release-performance enhancing control starting temperature Th3 is set to a temperature higher than the maximum value of the target coolant temperature Thwtrg, which is set in the control of the pump 44 by the cooling-system controlling section 120. That is, the heat-release-performance enhancing control starting temperature Th3 is a high temperature that is unreachable as long as the intake-air cooling system 40 operates without a problem and maintains appropriate control of the temperature of the coolant in the intake-air cooling system 40.

If the determining section 140 determines, in step S100, that the outlet coolant temperature Thwo, which is obtained by the obtaining section 130, is higher than or equal to the heat-release-performance enhancing control starting temperature Th3 (step S100: YES), the controller 100 performs step S110. In step S110, the cooling-system controlling section 120 of the controller 100 starts the heat-release-performance enhancing control. That is, if a problem occurs in the intake-air cooling system 40 and the outlet coolant temperature Thwo rises to the heat-release-performance enhancing control starting temperature Th3, which is unreachable as long as the appropriate control of the temperature of the coolant in the intake-air cooling system 40 is maintained, the heat-release-performance enhancing control is started.

In the heat-release-performance enhancing control, the cooling-system controlling section 120 controls the fan 43, the grille shutter 47, and the pump 44 to enhance the heat-release performance of the intake-air cooling system 40. Specifically, during the heat-release-performance enhancing control, the cooling-system controlling section 120 maintains the duty cycle of the pump 44 at 100%, maintains the duty cycle of the fan 43 at 100%, and maintains the grille shutter 47 in an open state. Specifically, the heat-release-performance enhancing control is performed with priority over the control of the pump 44 base on the target intake-air temperature Thatrg and the target coolant temperature Thwtrg and the control of the fan 43 and the grille shutter 47 based on the vehicle speed SPD, which have been described above.

By maintaining the duty cycle of the pump 44 at 100% in this manner, the circulation amount of the coolant in the intake-air cooling system 40 is maximized. Also, by maintaining the grille shutter 47 in the open state and maintaining the duty cycle of the fan 43 at 100%, the heat exchange between the air and the coolant by the radiator 42 is maximized. That is, by performing the heat-release-performance enhancing control, the heat-release performance of the intake-air cooling system 40 is enhanced maximally.

Specifically, after the heat-release-performance enhancing control is started in step S110, the cooling-system controlling section 120 continues the heat-release-performance enhancing control until returning control, which will be described later, is performed to end the heat-release-performance enhancing control. Therefore, if the heat-release-performance enhancing control has already been started and is thus being performed when the process is moved to step S110 from step S100, the cooling-system controlling section 120 simply continues the heat-release-performance enhancing control substantially without carrying out step S110.

As has been described, in the controller 100, the cooling-system controlling section 120 starts the heat-release-performance enhancing control on condition that the temperature of the coolant in the intake-air cooling system 40 has risen to a value at which the determining section 140 determines that the outlet coolant temperature Thwo, which is obtained by the obtaining section 130, is higher than or equal to the heat-release-performance enhancing control starting temperature Th3.

Following step S110, the controller 100 carries out step S120 of the procedure. In step S120, the determining section 140 of the controller 100 determines whether the outlet coolant temperature Thwo, which is obtained by the obtaining section 130, is higher than or equal to a forced-induction limiting control starting temperature Th4. Specifically, the forced-induction limiting control starting temperature Th4 is the temperature of the coolant that is the threshold value with reference to which forced-induction limiting control, which will be described later, is started and is set to a temperature that is lower than the boiling point Th5 of the coolant and is higher than the heat-release-performance enhancing control starting temperature Th3. That is, the forced-induction limiting control starting temperature Th4 is also a high temperature that is unreachable as long as the intake-air cooling system 40 operates without a problem and maintains appropriate control of the temperature of the coolant in the intake-air cooling system 40.

If the determining section 140 determines, in step S120, that the outlet coolant temperature Thwo, which is obtained by the obtaining section 130, is higher than or equal to the forced-induction limiting control starting temperature Th4 (step S120: YES), the controller 100 carries out step S130 of the procedure. In step S130, the forced-induction-device controlling section 110 of tie controller 100 starts the forced-induction limiting control. That is, the outlet coolant temperature Thwo exceeds the heat-release-performance enhancing control starting temperature Th3 and rises to the forced-induction limiting control starting temperature Th4, the forced-induction limiting control is started.

As has been described, in the controller 100, the forced-induction-device controlling section 110 starts the forced-induction limiting control on condition that the temperature of the coolant in the intake-air cooling system 40 has risen to a value at which the determining section 140 determines that the outlet coolant temperature Thwo, which is obtained by the obtaining section 130, is higher than or equal to the forced-induction limiting control starting temperature Th4.

After starting the forced-induction limiting control in step S130, the forced-induction-device controlling section. 110 updates a maximum forced-induction pressure Pimmax, which is a maximum control value of the forced-induction pressure, to the value equal to the forced-induction pressure Pim, which is obtained by the obtaining section 130. When the forced-induction limiting control is not performed, the maximum forced-induction pressure Pimmax is set to a constant value as an upper control, limit of the forced-induction pressure, which is necessary for ensuring the reliability of the diesel engine 10. Therefore, by starting the forced-induction limiting control in step 130, the maximum forced-induction pressure Pimmax is updated to a value lower than the corresponding value that was present before the start of the forced-induction limiting control. That is, the upper limit of the forced-induction pressure is lowered in response to the start of the forced-induction limiting control to increase the extent of limiting of the forced induction.

After the forced-induction limiting control is started in this manner, the forced-induction-device controlling section 110 performs the series of procedure represented in FIG. 3 repeatedly at predetermined control cycles to continue the forced-induction limiting control until the forced-induction limiting control is ended through the returning control, which will be described later, Therefore, if the forced-induction limiting control has already been started and is thus being performed when the process is moved to step S130 from step S120, the forced-induction-device controlling section 110 simply continues the forced-induction limiting control substantially without carrying out step S130.

Figure 3:
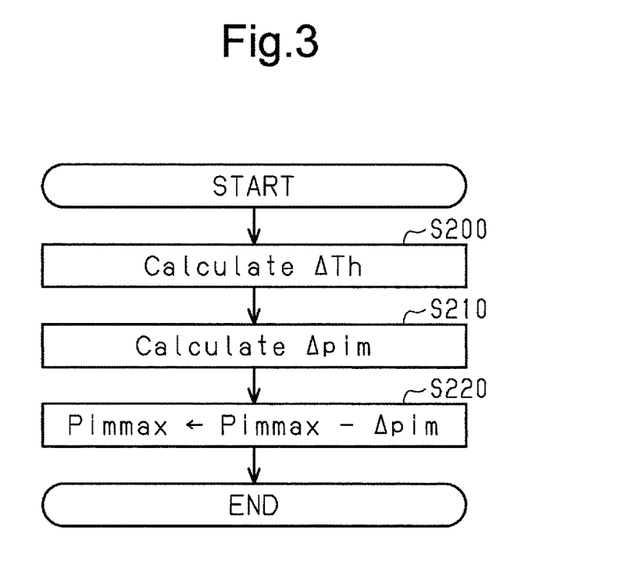
FIG. 3 is a flowchart representing a series of procedure of forced-induction limiting control performed by a forced-induction-device controlling section of the controller of the embodiment.

Referring to FIG. 3, when the series of procedure for the forced-induction limiting control is started, the forced-induction-device controlling section 110 first calculates a temperature difference $\Delta Th$ in step S200. The temperature difference $\Delta Th$ is the value obtained by subtracting a returning temperature Th2 from the outlet coolant temperature Thw, which is obtained by the obtaining section 130. Specifically, the returning temperature Th2 is the temperature of the coolant with reference to which the returning control, which will be described later, is started and is set to a temperature lower than the heat-release-performance enhancing control starting temperature Th3. That is, the returning temperature Th2, which is the threshold value with reference to which the heat-release-performance enhancing control or the forced-induction limiting control is ended, is set to a value at which determination that the risk op boiling of the coolant has been sufficiently lowered can be made. Therefore, the temperature difference $\Delta Th$, which is the difference obtained by subtracting the returning temperature Th2 from the outlet coolant temperature Thwo, indicates the greater the temperature difference $\Delta Th$ becomes greater, the closer to the boiling point T5 the outlet coolant temperature Thwo becomes and the higher the risk of boiling of the coolant becomes.

After calculating the temperature difference $\Delta Th$ in step S200, the forced-induction-device controlling section 110 carries out step S210 of the procedure and, in step S210, calculates the change amount $\Delta pim$ based on the temperature difference $\Delta Th$. Specifically, the change amount $\Delta pim$ is a value used to update the maximum forced-induction pressure Pimmax in the subsequent, step S220 of the procedure.

Figure 4:
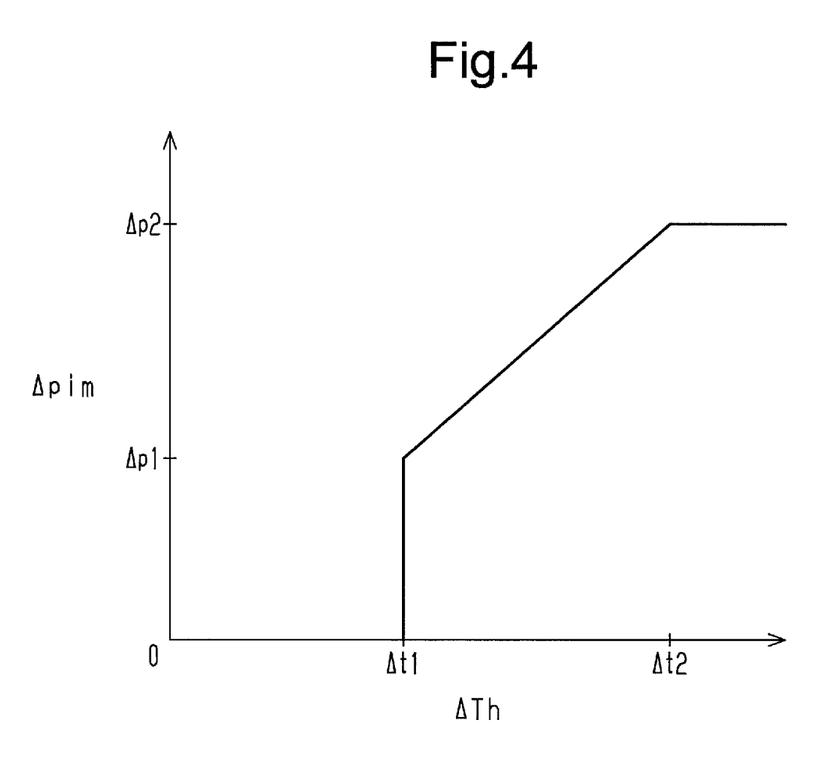
FIG. 4 is a graph representing the relationship between the temperature difference ΔTh with respect to a returning temperature and the change amount Δpim used to update the maximum forced-induction pressure in the forced-induction limiting control.

As represented in FIG. 4, the change amount $\Delta pim$ is 0 if the temperature difference $\Delta Th$ is smaller than $\Delta t1$. If the temperature difference $\Delta Th$ is greater than or equal to $\Delta t1$ and smaller than or equal to $\Delta t2$, the change amount $\Delta pim$ is calculated to become greater within the range from $\Delta p1$ to $\Delta p2$, which is greater than $\Delta p1$, as the temperature difference $\Delta Th$ becomes greater. Also, when the temperature difference. $\Delta Th$ is greater than $\Delta t2$, the change amount $\Delta pim$ is calculated to become $\Delta p2$ uniformly. Specifically, $\Delta p1$ and $\Delta p2$ are sufficiently small values such as tens of pascals to several kilopascals or one kilopascal or less, in contrast to the maximum forced-induction pressure Pimmax at the time the forced-induction limiting control is not performed, which is several hundreds of kilopascals. That is, if the temperature difference $\Delta Th$ is greater than or equal to $\Delta t1$ and smaller than or equal to $\Delta t2$, the forced-induction-device controlling section 110 calculates $\Delta pim$ such that the change amount $\Delta pim$ becomes greater as the outlet coolant temperature Thwo becomes closer to the boiling point Th5. Specifically, $\Delta t1$ is a value smaller than the difference between the forced-induction limiting control starting temperature Th4 and the returning temperature Th2 and $\Delta 2$ is a value smaller than the difference between the boiling point Th5 and the returning temperature Th2.

After calculating the change amount $\Delta pim$ in step S210, the forced-induction-device controlling section 110 performs step S220 of the procedure. In step S220, the forced-induction-device controlling section 110 updates the maximum forced-induction pressure Pimmax. Specifically, the forced-induction-device controlling section 110 calculates the difference obtained by subtracting the change amount $\Delta pim$ from the maximum forced-induction pressure Pimmax and sets the calculated difference as a new maximum forced-induction pressure Pimmax, thus updating the maximum forced-induction pressure Pimmax. After updating the maximum forced-induction pressure Pimmax in this manner, the forced-induction-device controlling section 110 suspends the series of procedure.

By performing the series of procedure repeatedly, the maximum forced-induction pressure Pimmax is updated continuously to be gradually lowered as long as the temperature difference $\Delta Th$ is greater than or equal to $\Delta t1$. By gradually lowering the maximum forced-induction pressure Pimmax in this manner, the target forced-induction pressure Pimtrg, the upper limit of setting of which is the maximum forced-induction pressure Pimmax, is also gradually lowered. The forced induction is thus gradually limited. Since the change amount $\Delta pim$ is set to become greater as the temperature difference $\Delta Th$ becomes greater, the lowering amount of the maximum forced-induction pressure Pimmax becomes greater as the outlet coolant temperature Thwo becomes closer to the boiling point Th5 of the coolant. Also, if the temperature difference $\Delta Th$ is smaller than $\Delta t1$, the change amount $\Delta pim$ is 0. This maintains the maximum forced-induction pressure Pimmax.

That is, in the forced-induction limiting control, the maximum forced-induction pressure Pimmax is lowered using, as the starting point, the forced-induction pressure Pim at the time the determining section 140 determines that the outlet coolant temperature Thwo is higher than or equal to the forced-induction limiting control starting temperature Th4. In this manner, the forced-induction pressure Pim is lowered in relation to the corresponding value that was present before the determining section 140 determined that the outlet coolant temperature Thwo was higher than or equal to the forced-induction limiting control starting temperature Th4. Also, as the outlet coolant temperature Thwo, which is obtained by the obtaining section 130, becomes closer to the boiling point Th5 of the coolant, the change amount $\Delta pim$ for lowering the forced-induction pressure Pim is set greater such that the extent of limiting of the forced induction is increased by a greater amount. In contrast, when the temperature difference $\Delta Th$ decreases and is in the range smaller than $\Delta t1$, the extent of limiting of the forced induction is unchanged. That is, when the risk of boiling becomes low, changing the extent of limiting of the forced induction is stopped and the limited state of the forced induction continues while the extent of limitation is maintained.

With reference to FIG. 2, after performing step S130 of the procedure to start the above-described forced-induction limiting control, the controller 100 suspends the series of procedure. Specifically, if the determining section 140 determines, in step S120, that the outlet coolant temperature Thwo, which is obtained by the obtaining section 130, is smaller than the forced-induction limiting control starting temperature Th4 (step S120: NO), the controller 100 suspends the series of procedure. That is, if the outlet coolant temperature Thwo has risen to a value higher than or equal to the heat-release-performance enhancing control starting temperature Th3 but not yet reached the forced-induction limiting control starting temperature Th4, the heat-release-performance enhancing control is continued without starting the forced-induction limiting control.

In other words, the controller 100 performs both the heat-release-performance enhancing control and the forced-induction limiting control when the outlet coolant temperature Thwo is higher than or equal to the forced-induction limiting control starting temperature Th4. In contrast, if the outlet coolant temperature Thwo has become higher than or equal to the heat-release-performance enhancing control starting temperature Th3 but not yet become higher than or equal to the forced-induction limiting control starting temperature Th4, the controller 100 performs only the heat-release-performance enhancing control without performing the forced-induction limiting control.

If the determining section 140 determines, in step S100, that the outlet coolant temperature Thwo, which is obtained by the obtaining section 130, is lower than the heat-release-performance enhancing control starting temperature Th3 (step S100: NO), the controller 100 performs step S140 of the procedure. In step S140, the determining section 140 determines whether the outlet coolant temperature Thwo, which is obtained by the obtaining section 130, is lower than or equal to the returning temperature Th2.

If the determining section 140 determines, in step S140, that the outlet coolant temperature Thwo, which is obtained by the obtaining section 130, is lower than or equal to the returning temperature Th2 (step S140: YES), the controller 100 performs step S150 of the procedure. In step S150, the forced-induction-device controlling section 110 and the cooling-system controlling section 120 start the returning control.

The returning control is the control by which the heat-release-performance enhancing control and the forced-induction limiting control are ended such that the control of the intake-air cooling system 40 and the control of the turbocharger 20 are returned to normal states. The returning control is performed respectively by the cooling-system controlling section 120 and the forced-induction-device controlling section 110.

As the returning control is started, the cooling-system controlling section 120 cancels the maintenance of the duty cycle of the pump 44 at 100%, the maintenance of the duty cycle of the fan 43 at 100%, and the maintenance of the grille shutter 47 in the open state. By performing the returning control in this manner, the heat-release-performance enhancing control is ended immediately. After the heat-release-performance enhancing control is ended in this manner, the returning control by the cooling-system controlling section 120 is ended.

In contrast, if, at the start of the returning control, the forced-induction pressure Pim is equal to the maximum forced-induction pressure Pimmax, or the target forced-induction pressure Pimtrg is limited by the maximum forced-induction pressure Pimmax and thus equalized to the maximum forced-induction pressure Pimmax, the forced-induction-device controlling section 110 gradually raises the maximum forced-induction pressure Pimmax. In this manner, the forced-induction-device controlling section 110 ends the forced-induction limiting control.

In other words, when the target forced-induction pressure Pimtrg is limited by the maximum forced-induction pressure Pimmax, which has been lowered through the forced-induction limiting control, and the forced induction is limited, the forced-induction-device controlling section 110, after starting the returning control, lowers the extent of limiting of the forced induction gradually over time, thus ending the forced-induction limiting control. Specifically, the forced-induction-device controlling section 110 raises the maximum forced-induction pressure Pimmax by a predetermined amount each time a predetermined time elapses.

Then, when the maximum forced-induction pressure Pimmax becomes higher than the target forced-induction pressure Pimtrg, the forced-induction-device controlling section 110 updates the maximum forced-induction pressure Pimmax to the corresponding value that was present before the forced-induction limiting control and ends the forced-induction limiting control.

Specifically, if, at the time point at which the returning control is started, the maximum forced-induction pressure Pimmax is already higher than the target forced-induction pressure Pimtrg, the forced-induction-device controlling section 110 immediately updates the maximum forced-induction pressure Pimmax to the corresponding value that was present before the forced-induction limiting control, thus ending the forced-induction limiting control. That is, when the target forced-induction pressure Pimtrg is not limited by the maximum forced-induction pressure Pimmax and the forced-induction pressure. Pim is lower than the maximum forced-induction pressure Pimmax, the forced-induction-device controlling section 110 immediately updates the maximum forced-induction pressure Pimmax to the corresponding value that was present before the forced-induction limiting control, thus ending the forced-induction limiting control. By ending the forced-induction limiting control in this manner, the returning control by the cooling-system controlling section 120 is ended.

Specifically, the returning control can be started only when the heat-release-performance enhancing control or the forced-induction limiting control is performed. Therefore, when step S150 of the procedure should be performed following step S140 but the heat-release-performance enhancing control or the forced-induction limiting control is not performed, the controller 100 substantially does not perform step S150, When step S150 of the procedure should be performed following step S140 and the heat-release-performance enhancing control is performed but not the forced-induction limiting control, only the returning control by the cooling-system controlling section 120 is performed. The cooling-system controlling section 120 thus ends the heat-release-performance enhancing control.

After performing step S150 of the procedure, the controller 100 suspends the series of procedure. When the determining section 140 determines, in step S140, that the outlet coolant temperature Thwo, which is obtained by the obtaining section 130, is higher than the returning temperature Th2 (step S140: NO), the controller 100 ends the series of procedure without performing step S150 of the procedure.

By performing the series of procedure repeatedly, the diesel engine 10 performs the heat-release-performance enhancing control and the forced-induction limiting control, which are controls for preventing boiling of the coolant, in the above-described manner in accordance with the outlet coolant temperature Thwo, which is obtained by the obtaining section 130. The heat-release-performance enhancing control and the forced-induction limiting control are each ended by performing the returning control by means of the corresponding one of the cooling-system controlling section 120 and the forced-induction-device controlling section 110 on condition that the determining section 140 determines that the outlet coolant temperature Thwo, which is obtained by the obtaining section 130, is lower than or equal to the returning temperature Th2.

The operation of the controller 100 will now be specifically described with reference to FIG. 5.

Figure 5:
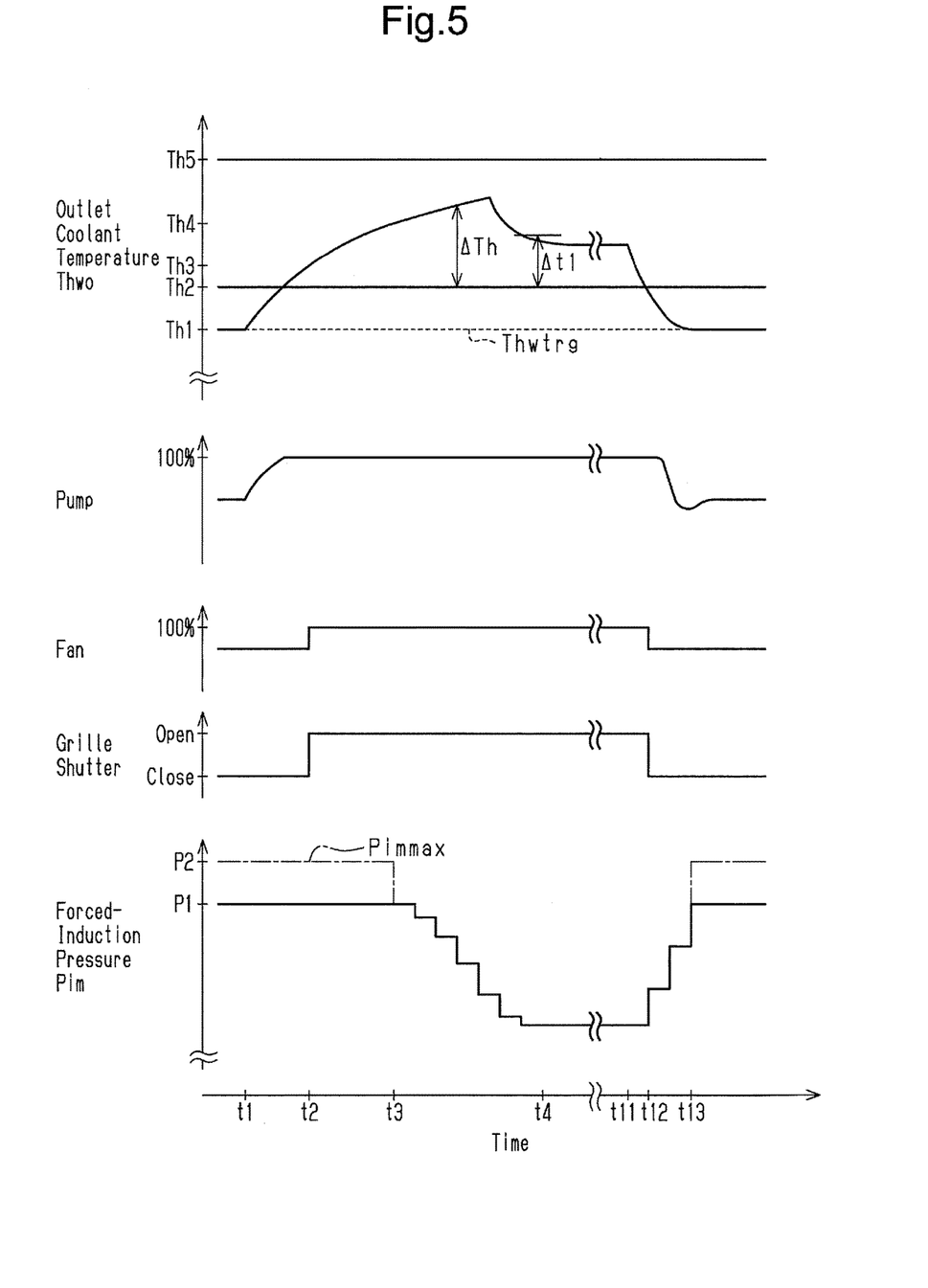
FIG. 5 is a timing chart representing the relationship among movement of the outlet coolant temperature Thwo, movement of operation of a pump, operation of a fan, and operation of a grille shutter, and movement of the forced-induction pressure Pim.

FIG. 5 represents an example of a case in which a foreign object such as a piece of cardboard adheres to the radiator 42 during high-load and high-speed cruising. FIG. 5 is a timing chart that represents the relationship among movement of the outlet coolant temperature Thwo, movement of operation of the pump 44, operation of the fan 43, peration of the grille shutter 47, and movement of the forced-induction pressure Pim. The timing chart represents change cycles and the change amount of the forced-induction pressure Pim corresponding to updating cycles of the maximum forced-induction pressure Pimmax and the change amount Δpim of the maximum forced-induction pressure Pimmax, respectively, in exaggerated manners for illustrative purposes.

With reference to FIG. 5, at point in time t1, a foreign object adheres to the radiator 42 and hampers heat release by the radiator 42, so that the outlet coolant temperature Thwo starts to rise. As the outlet coolant temperature Thwo rises, the outlet coolant temperature Thwo exceeds the target coolant temperature Thwtrg and the duty cycle of the pump 44 increases. At this stage, the target coolant temperature Thwtrg is Th1, which is lower than the returning temperature Th2. Also, at this time, since the vehicle travels at a high speed, the duty cycle of the fan 43 is smaller than 100% and the grille shutter 47 is open. Further, although the target forced-induction pressure Pimtrg is P1, which is comparatively high, the maximum forced induction pressure Pimmax at this time is pressure P2, which is higher than P1. The target forced-induction pressure Pimtrg is not yet limited by the maximum forced-induction pressure Pimmax and the forced-induction pressure Pim is maintained at P1.

At point in time t2, the outlet coolant temperature Thwo reaches the heat-release-performance enhancing control starting temperature Th3 and the heat-release-performance enhancing control is started. As a result, the duty cycle of the pump 44 is maintained at 100%, the duty cycle of the fan 43 is maintained at 100%, and the grille shutter 47 is maintained in an open state. Specifically, in the example represented in FIG. 5, the duty cycle of the pump 44, which has started to increase as the outlet coolant temperature Thwo rises, reaches 100% before point in time t2.

In the example represented in FIG. 5, although the heat-release-performance enhancing control is performed to maximize the heat-release performance of the intake-air cooling system 40, the heat-release performance is insufficient and the outlet coolant temperature Thwo continues to rise.

Then, at point in time t3, the outlet coolant temperature Thwo reaches the forced-induction limiting control starting temperature Th4 and the forced-induction limiting control is started. As a result, at Point in time t3, the maximum forced-induction pressure Pimmax is updated to P1, which is equal to the forced-induction pressure Pim. After point in time t3, the change amount Δpim corresponding to the temperature difference ΔTh is calculated and the maximum forced-induction pressure Pimmax is lowered by the amount corresponding to the calculated change amount Δpim. As the maximum forced-induction pressure Pimmax is gradually lowered in this manner, the target forced-induction pressure Pimtrg becomes limited by the maximum forced-induction pressure Pimmax and is thus gradually lowered. The forced-induction pressure Pim is thus lowered correspondingly as the maximum forced-induction pressure Pimmax is lowered.

In the example represented in FIG. 5, as the extent of limiting of the forced induction is gradually increased through the forced-induction limiting control to limit the forced induction, the outlet coolant temperature Thwo starts to lower. Then, after point in time t4, the temperature difference ΔTh is smaller than Δt1 and the change amount Δpim is "0". As a result, lowering of the maximum forced-induction pressure Pimmax is stopped and the forced-induction pressure Pim is maintained.

Subsequently, at point in time t11, the foreign object that adheres to the radiator 42 is removed, which recovers the heat-release performance of the intake-air cooling system 40. The outlet coolant temperature Thwo thus starts to lower.

Next, at point in time t12, the outlet coolant temperature Thwo is lowered to the returning temperature Th2 and the returning control is started. In this manner, the heat-release-performance enhancing control is ended to cancel the maintenance of the duty cycle of the pump 44 at 100%, the maintenance of the duty cycle of the fan 43 100%, and the maintenance of the grille shutter 47 in the open state. Also, the maximum forced-induction pressure Pimmax is gradually raised and the extent of limiting of the forced induction is gradually lowered. This gradually raises the forced-induction pressure Pim. In the example represented in FIG. 5, the outlet coolant temperature Thwo is lowered to a value that is substantially equal to the temperature Th1, which is the target coolant temperature Thwtrg, at a transient stage of gradual lowering of the extent of limiting of the forced induction in the above-described manner.

Then, at point in time t13, the maximum forced-induction pressure Pimmax becomes higher than or equal to pressure P1, which is the target forced-induction pressure Pimtrg, and the maximum forced-induction pressure Pimmax is raised to P2, which is the maximum forced-induction pressure Pimmax before the forced-induction limiting control. The forced-induction limiting control is thus ended.

As has been described, in the example represented in FIG. 5, by performing the heat-release-performance enhancing control and the forced-induction limiting control, the outlet coolant temperature Thwo is maintained in the range lower than the boiling point Th5. Boiling of the coolant is thus prevented.

The above-described embodiment achieves the following advantages.

(1) When the outlet coolant temperature Thwo rises to a value higher than or equal to the forced-induction limiting control starting temperature Th4, the maximum forced-induction pressure Pimmax is gradually lowered through the forced-induction limiting control, while monitoring the outlet coolant temperature Thwo. The extent of limiting of the forced induction is thus gradually increased. This limits excessive limitation of the forced induction, compared to a case in which the forced induction is limited to a constant extent when the temperature of the coolant flowing in the intake-air cooling system 40 becomes close to the boiling point.

(2) in the forced-induction limiting control, the extent of limiting of the forced induction is updated by updating the maximum forced-induction pressure Pimmax based on the outlet coolant temperature Thwo, which ds repeatedly obtained. As the outlet coolant temperature Thwo becomes closer to the boiling point Th5, the change amount pim, which is used to update the maximum forced-induction pressure Pimmax, becomes greater and the change amount of the extent of limiting of the forced induction for a single time of updating becomes higher. Therefore, when the extent of limitation is insufficient and the temperature of the coolant becomes closer to the boiling point Th5, the extent of limiting of the forced induction is increased by a greater amount. That is, when the extent of limiting of the forced induction is gradually changed but remains insufficient, the extent of limitation is quickly increased. This limits insufficient limitation of the forced induction.

(3) With the advantages (1) and (2) combined, while the forced induction is limited to prevent overheating, significant decrease of the output of the diesel engine 10 is limited.

(4) The forced induction is limited by controlling the maximum forced-induction pressure Pimmax, which is the upper control limit of the forced induction. Therefore, when the target forced-induction pressure Pimtrg is lower than the maximum forced-induction pressure Pimmax, the forced-induction pressure Pim is controlled to become equal to the target forced-induction pressure Pimtrg. That is, unnecessarily great limitation of the forced induction is limited.

(5) When a foreign object that adheres to the radiator 42 is removed to recover the heat release performance of the radiator 42, so that the outlet coolant temperature Thwo is lowered to the returning temperature Th2, the returning control is started. This ends the heat-release-performance enhancing control and the forced-induction limiting control to cancel the restrictions by these controls, thus ensuring return to normal controlling.

(6) After the extent of limiting of the forced induction is increased through the forced-induction limiting control and the outlet coolant temperature Thwo is lowered to a value in a range where the temperature difference ΔTh with respect to the returning temperature Th2 becomes smaller than or equal to Δt1, the extent of limiting of the forced induction is maintained. As a result, while the temperature of the coolant is maintained in a range where boiling does not occur, change of the extent of limiting of the forced induction is ended to stabilize the operating state of the diesel engine 10.

(7) The change of the extent of limiting of the forced induction is ended before the outlet coolant temperature Thwo is lowered to the returning temperature Th2 This prevents the forced-induction limiting control from being ended by lowering of the outlet coolant temperature Thwo to a value lower than the returning temperature Th2 due to increasing of the extent of limiting of the forced induction. Specifically, if such lowering of the outlet coolant temperature Thwo occurs, the forced-induction limiting control is ended to cancel the limitation of the forced induction. This causes re-rise of the temperature of the coolant such that the forced-induction limiting control is performed, which is hunting. The above-described embodiment prevents the occurrence of such hunting.

(8) If the forced-induction limiting control is ended and the extent of limiting of the forced induction is lowered quickly to cancel the limitation of the forced induction, the forced-induction pressure Pim may rise rapidly. However, in the above-described embodiment, the maximum forced-induction pressure Pimmax is gradually raised to gradually lower the extent of limiting of the forced induction. This prevents rapid rise of the forced-induction pressure Pim at the time the forced-induction limiting control is ended.

(9) Before performing the forced-induction limiting control, the heat-release-performance enhancing control, which enhances the heat-release performance of the intake-air cooling system 40, is performed to prevent overheating. Then, if the outlet coolant temperature Thwo rises despite the heat-release-performance enhancing control and reaches the forced-induction limiting control starting temperature Th4, the forced-induction limiting control is started. That is, the heat-release-performance enhancing control, which prevents overheating without decreasing the output of the diesel engine 10, is first performed. Then, if prevention of overheating is unachievable, the forced-induction limiting control is performed. Therefore, a means for preventing overheating can be employed while refraining from performing the forced-induction limiting control, which would decrease the output of the diesel engine 10. This prevents the output of the diesel engine 10 from being limited in order to prevent overheating.

The above-described embodiment may be modified as follows.

The controlling manner of the intake-air cooling system 40 at a normal time, at which the heat-release-performance enhancing control is not performed, may be changed as needed. That is, the controlling manner of the intake-air cooling system 40 at the normal time, at which the heat-release-performance enhancing control is not performed, is not restricted to the corresponding controlling manner described in the illustrated embodiment.

The controlling manner of the turbocharger 20 at a normal time, at which the forced-induction limiting control is not performed, may be changed as needed. That is, the controlling manner of the turbocharger 20 at the normal time, at which the forced-induction limiting control is not performed, is not restricted to the corresponding controlling manner described in the illustrated embodiment.

The means for adjusting the forced-induction pressure is not restricted to the variable nozzle 23. The means may be a waste gate valve that selectively opens and closes a bypass passage, which causes exhaust gas to flow bypassing the turbine wheel 22*a*.

The turbocharger 20, which is an exhaust-gas-driven type and drives the turbine wheel 22*a* using exhaust gas flow, has been described as the forced-induction device. However, the forced-induction device may be a motor-driven turbocharger. In this case, in the forced-induction limiting control, the forced induction is limited by controlling the motor.

The controller 100, the control target of which is the diesel engine 10, has been described. However, a similar configuration may be employed in a controller the control target of which is a gasoline engine.

By starting the heat-release-performance enhancing control before starting the forced-induction limiting control, the same advantage as the advantage (9) can be obtained. Therefore, as long as the heat-release-performance enhancing control can be started before the forced-induction limiting control is started, the condition for starting the heat-release-performance enhancing control and/or the condition for starting the forced-induction limiting control may be changed as needed. For example, the heat-release-performance enhancing control may be first started when the determining section 140 determines that the outlet coolant temperature Thwo is higher than or equal to the forced-induction limiting control starting temperature Th4. Then, if the heat-release-performance enhancing control is continued for a predetermined time and the outlet coolant temperature Thwo remains higher than or equal to the forced-induction limiting control starting temperature Th4, the forced-induction limiting control may be started. Even when this configuration is employed, the heat-release-enhancing control is performed before the forced-induction limiting control is started.

The manner in which the heat-release-performance control is performed may be changed as needed as long as the heat-release performance is enhanced. Since enhancing the heat-release performance of the intake-air cooling system 40 ensures at least a certain level of effect, the heat-release performance of the intake-air cooling system 40 does not necessarily have to be maximized. For example, the duty cycle of the fan 43 may be set to any value, other than 100%, greater than the corresponding value that was present before the start of the heat-release-performance enhancing control. Also, the duty cycle of the pump 44 may be se to any value, other than 100%, greater than the corresponding value that was present before the start of the heat-release-performance enhancing control. Further, in the heat-release-performance enhancing control, control of any one of the pump 44, the fan 43, and the grille shutter 47 may be omitted. For example, control for maintaining the grille shutter 47 in an open state does not necessarily have to be performed.

The pump 44 does not necessarily have to be driven by a motor. For example, a mechanically-driven pump may be employed. In this case, however, the heat-release-performance enhancing control cannot increase the drive amount of the pump 44.

The intake-air cooling system 40 does not necessarily have to include the grille shutter 47. In a case without the grille shutter 47, however, the heat-release-performance enhancing control cannot enhance the heat-release performance by maintaining the grille shutter 47 in an open state as compared to the heat-release-performance before the heat-release-performance enhancing control is performed.

In the forced-induction limiting control of the illustrated embodiment, the change amount Δpim is set to 0 if the temperature difference ΔTh is smaller than Δt1, so that the extent of limiting of the forced induction remains unchanged as long as the temperature difference ΔTh is small. However, the extent of limiting of the forced induction may be changed even when the temperature difference ΔTh is small. For example, Δpim may be set to become greater as the temperature difference Δth becomes greater, without setting a range in which Δpim is set to 0.

In the forced-induction limiting control of the illustrated embodiment, the maximum forced-induction pressure Pimmax is updated by the amount corresponding to the change amount Δpim. This repeatedly updates the extent of limiting of the forced induction, thus gradually changing the extent of limiting of the forced induction. However, the manner of changing the extent of limiting of the forced induction is not restricted to this manner. For example, the maximum forced-induction pressure Pimmax may be calculated directly based on the temperature difference ΔTh such that the maximum forced-induction pressure Pimmax becomes greater as the temperature difference ΔTh becomes greater. In this manner, the extent of limiting of the forced induction is set to become higher as the outlet coolant temperature Thwo becomes closer to the boiling point Th5.

Limitation of the forced induction is not restricted to the controlling manner in which the forced induction is limited by controlling the maximum forced-induction pressure Pimmax but may be performed in any other controlling manner. For example, the target forced-induction pressure Pimtrg may be calculated based on the outlet coolant temperature Thwo such that the target forced-induction pressure Pimtrg becomes lower as the outlet coolant temperature Thwo becomes higher. In this manner, the extent of limiting of the forced induction is set to become higher as the outlet coolant temperature Thwo becomes closer to the boiling point Th5.

In the illustrated embodiment, when ending the forced-induction limiting control, the extent of limiting of the forced induction is gradually lowered to gradually cancel the limitation of the forced induction, thus ending the forced-induction limiting control. However, the limitation of the forced induction may be canceled quickly when the returning control is started. Also in this case, performing the forced-induction limiting control ensures the effect of limiting significant decrease of the output of the internal combustion engine while limiting the forced induction to limit overheating.

In the illustrated embodiment, the returning control is started to end the heat-release-performance enhancing control and the forced-induction limiting control on condition that the determining section 140 determines that the outlet coolant temperature Thwo, which is obtained by the obtaining section 130, is lower than or equal to the turning temperature Th2. However, the condition for ending the heat-release-performance enhancing control and the condition for ending the forced-induction limiting control do not necessarily have to be the same as each other. Also, the timing for ending the heat-release-performance enhancing control and/or the timing for ending the forced-induction limiting control may be changed as needed. For example, the forced-induction limiting control may be ended before the heat-release-performance enhancing control is ended.

The heat-release-performance enhancing control may be omitted.

The coolant temperature sensor 54 does not necessarily have to be arranged at a position closer to the intercooler 41 than the pump 44 in the first coolant passage 45. That is, the temperature of the coolant obtained by the obtaining section 130 does not necessarily have to be the temperature of the coolant in the vicinity of the coolant outlet of the intercooler 41. That is, the coolant temperature sensor 54 may be arranged at any position at which the coolant temperature sensor 54 is allowed to detect the temperature of the coolant in the intake-air cooling system 40. However, the temperature of the coolant in the intake-air cooling system 40 is highest in a section of the intercooler 41 close to the coolant outlet. Therefore, to accurately determine the risk of boiling of the coolant with reference to the temperature of the coolant, it is preferable to obtain the temperature of the coolant in the vicinity of the coolant outlet of the intercooler 41.

The controller 100 is not limited to a device that includes a central processing unit and a memory and executes all the above-described processes through software. For example, the controller 100 may include dedicated hardware (an application specific integrated circuit: ASIC) that executes at least part of the various processes. That is, the controller 100 may be circuitry including 1) one or more dedicated hardware circuits such as an ASIC, 2) one or more processors (microcomputers) that operate according to a computer program (software), or 3) a combination thereof.

The invention claimed is:

1. A controller configured to be employed in an internal combustion engine including a forced-induction device, an intercooler configured to cool air compressed by the forced-induction device, a radiator configured to release heat from coolant that has passed through the intercooler, and a pump arranged in an intake-air cooling system in which the intercooler and the radiator are arranged, the controller comprising:
  an obtaining section configured to obtain a temperature of the coolant in the intake-air cooling system;
  a determining section configured to determine whether the temperature obtained by the obtaining section is higher than or equal to a forced-induction limiting control starting temperature, the forced-induction limiting control starting temperature being lower than a boiling point of the coolant; and
  a forced-induction-device controlling section configured to:
    control the forced-induction device;
    upon the temperature of the coolant in the intake-air cooling system rising to a value determined by the determining section to be higher than or equal to the forced-induction limiting control starting temperature, lower a forced-induction pressure to a value lower than a value of the forced-induction pressure before the determination by the determining section; and
    decrease an amount of forced induction as the temperature obtained by the obtaining section approaches the boiling point of the coolant in the intake-air cooling system.

2. The controller configured to be employed in the internal combustion engine according to claim 1, wherein the forced-induction-device controlling section is configured to:
  repeatedly update the amount of forced induction with a plurality of update operations while varying an amount with which the forced induction is changed for each update operation of the plurality of update operations based on the temperature obtained by the obtaining section, and
  increase the amount with which the forced induction is changed with each update operation of the plurality of update operations as the temperature obtained by the obtaining section approaches the boiling point of the coolant in the intake-air cooling system.

3. The controller configured to be employed in the internal combustion engine according to claim 1, wherein the forced-induction-device controlling section is configured to lower an upper control limit of the forced-induction pressure as the temperature obtained by the obtaining section approaches the boiling point of the coolant in the intake-air cooling system.

4. The controller configured to be employed in the internal combustion engine according to claim 1, wherein:
  the determining section is configured to determine whether the temperature obtained by the obtaining section is lower than or equal to a returning temperature, the returning temperature being lower than the forced-induction limiting control starting temperature, and
  the forced-induction-device controlling section is configured to terminate control of the forced-induction device upon the determining section determining that the temperature obtained by the obtaining section is lower than or equal to the returning temperature.

5. The controller configured to be employed in the internal combustion engine according to claim 4, wherein the forced-induction-device controlling section is configured to maintain the forced induction in response to the temperature obtained by the obtaining section being lower than the forced-induction limiting control starting temperature and within a predetermined deviation with respect to the returning temperature.

6. The controller configured to be employed in the internal combustion engine according to claim 4, wherein the forced-induction-device controlling section is configured to, during termination of control of the forced-induction device, gradually lessen control of the forced induction device.

7. The controller configured to be employed in the internal combustion engine according to claim 1, further comprising:
  a cooling-system controlling section configured to control a shutter and the pump, the shutter being disposed in front of the radiator and a fan in a vehicle front-rear direction, the fan being configured to deliver air to the radiator, the shutter being configured to selectively open and close part of an air delivery path to the radiator, wherein:
  the determining section is configured to determine whether the temperature obtained by the obtaining section is higher than or equal to a heat-release-performance enhancing control starting temperature, the heat-release-performance enhancing control starting temperature being lower than the forced-induction limiting control starting temperature, and
  the cooling-system controlling section is configured to control the fan, the shutter, and the pump to enhance a heat-release performance of the intake-air cooling system, upon the temperature of the coolant in the intake-air cooling system rising to a value determined by the determining section to be higher than or equal to the heat-release-performance enhancing control starting temperature.

8. A control method for an internal combustion engine including a forced-induction device, an intercooler configured to cool air compressed by the forced-induction device, a radiator configured to release heat from coolant that has passed through the intercooler, and a pump arranged in an intake-air cooling system in which the intercooler and the radiator are arranged, the control method comprising:
  controlling the forced-induction device;
  repeatedly obtaining a temperature of the coolant in the intake-air cooling system;
  determining whether the obtained temperature is higher than or equal to a forced-induction limiting control starting temperature, the forced-induction limiting control starting temperature being lower than a boiling point of the coolant;
  upon the temperature of the coolant in the intake-air cooling system rising to a value higher than or equal to the forced-induction limiting control starting temperature, lowering a forced-induction pressure to a value lower than a value of the forced-induction pressure before the determination of whether the obtained temperature is higher than or equal to the forced-induction limiting control starting temperature; and
  decreasing an amount of forced induction as the obtained temperature approaches the boiling point of the coolant in the intake-air cooling system.

9. A controller configured to be employed in an internal combustion engine including a forced-induction device, an intercooler configured to cool an air compressed by the forced-induction device, a radiator configured to release heat from coolant that has passed through the intercooler, and a pump arranged in an intake-air cooling system in which the intercooler and the radiator are arranged, the controller comprising circuitry, the circuitry being configured to:
  control the forced-induction device, repeatedly obtain a temperature of the coolant in the intake-air cooling system, determine whether the obtained temperature is higher than or equal to a forced-induction limiting control starting temperature, the forced-induction limiting control starting temperature being lower than a boiling point of the coolant, upon the temperature of the coolant in the intake-air cooling system rising to a value higher than or equal to the forced-induction limiting control starting temperature, lower a forced-induction pressure to a value lower than the forced-induction pressure before the determination of whether the obtained temperature is higher than or equal to the forced-induction limiting control starting temperature, and decrease an amount of forced induction as the obtained temperature approaches the boiling point of the coolant in the intake-air cooling system.

\* \* \* \* \*